United States Patent [19]

Ogata et al.

[11] Patent Number: 4,476,505
[45] Date of Patent: Oct. 9, 1984

[54] MINIATURE TYPE TAPE CASSETTE

[75] Inventors: Haruki Ogata, Sagamihara; Kimio Ogawa; Hiroyuki Umeda, both of Yokohama, all of Japan

[73] Assignee: Victor Company of Japan, Ltd., Yokohama, Japan

[21] Appl. No.: 340,106

[22] Filed: Jan. 18, 1982

[30] Foreign Application Priority Data

Jan. 20, 1981 [JP] Japan ................................. 56-7566

[51] Int. Cl.$^3$ ...................... G11B 15/66; G11B 23/08
[52] U.S. Cl. .................................... 360/94; 360/132; 360/96.5
[58] Field of Search ...................... 360/132, 94, 96.5; 242/199

[56] References Cited

U.S. PATENT DOCUMENTS 3,008,012  11/1961  Proctor .............................. 360/132

FOREIGN PATENT DOCUMENTS

| 1805866 | 7/1970 | Fed. Rep. of Germany . |
| 2242808 | 3/1974 | Fed. Rep. of Germany . |
| 2658586 | 7/1977 | Fed. Rep. of Germany . |
| 2022333 | 7/1970 | France . |
| 2435105 | 3/1980 | France . |
| 1289153 | 9/1972 | United Kingdom . |
| 1409451 | 10/1975 | United Kingdom . |
| 1527884 | 10/1978 | United Kingdom . |

Primary Examiner—Robert S. Tupper
Attorney, Agent, or Firm—Louis Bernat

[57] ABSTRACT

A miniature type tape cassette used with respect to a standard type recording and/or reproducing apparatus which performs recording and/or reproduction when loaded with a standard type tape cassette and with respect to a recording and/or reproducing apparatus of a type different from the standard type recording and/or reproducing apparatus comprises a cassette case having a size smaller than that of the standard type tape cassette, and a tape accommodated within the cassette case. The miniature type tape cassette is loaded independently into the recording and/or reproducing apparatus of a type different from the standard type recording and/or reproducing apparatus, and loaded into the standard type recording and/or reproducing apparatus together with a tape cassette adapter having an external form and size substantially equal to those of the standard type tape cassette, in a state where the miniature type tape cassette is accommodated within the tape cassette adapter and the tape is drawn out from the cassette case to form a predetermined tape path. The cassette case is provided with a cutout part, and this cutout part is inserted with a moving lever provided on said tape cassette adapter, which moves in relation to the drawing of the tape out from the cassette case.

8 Claims, 30 Drawing Figures

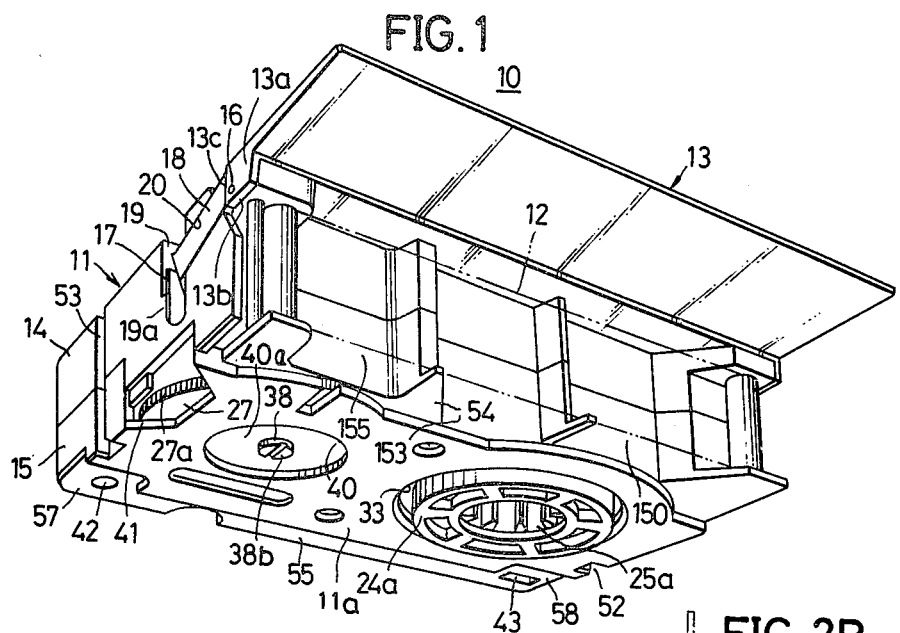
FIG. 1
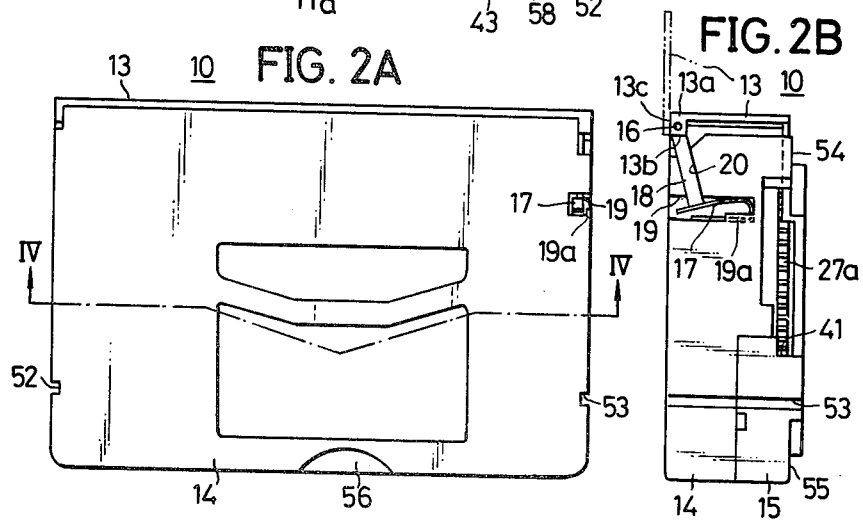
FIG. 2A
FIG. 2B
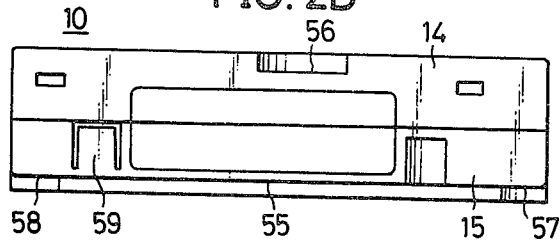
FIG. 2D

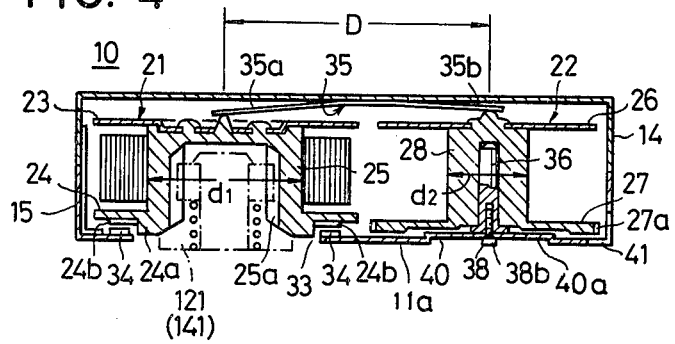
FIG. 4
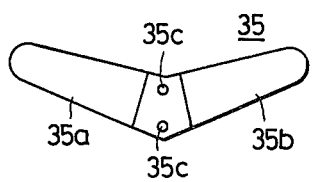
FIG. 5A
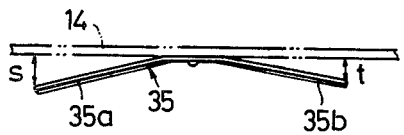
FIG. 5B
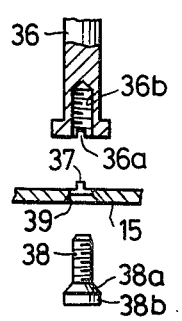
FIG. 6A
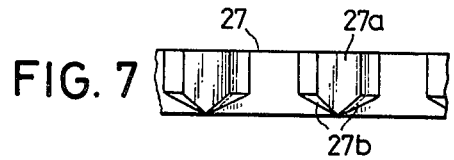
FIG. 7
FIG. 14
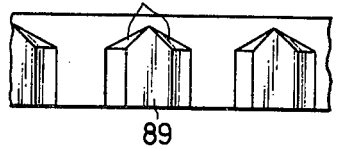
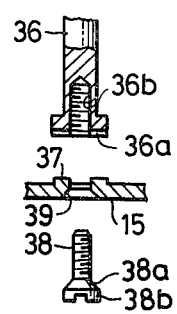
FIG. 6B
FIG. 8
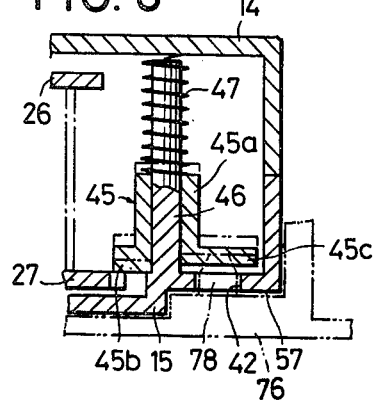

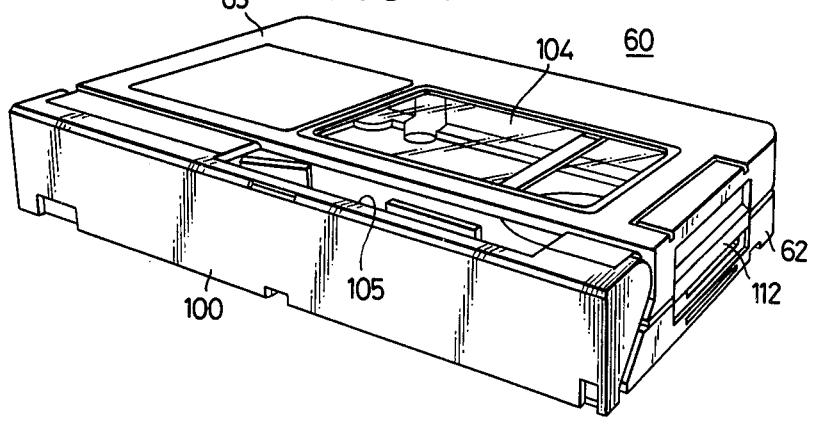
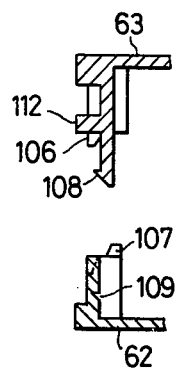
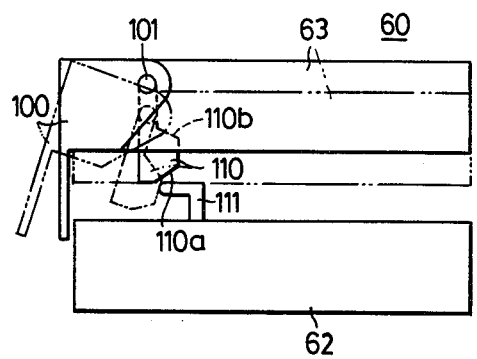
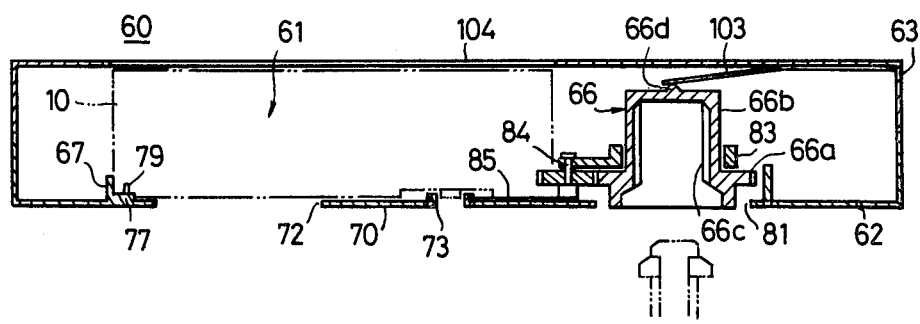

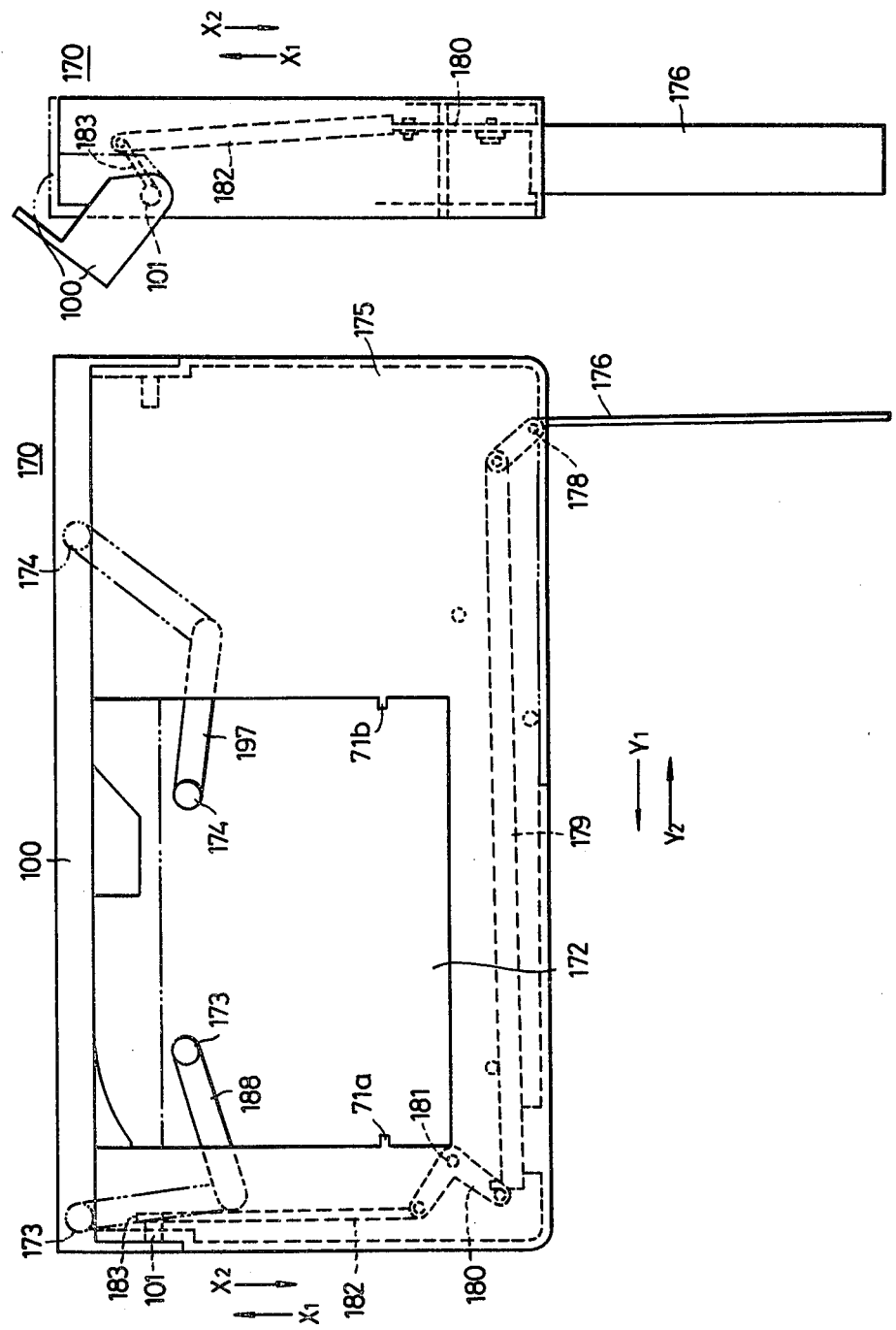

MINIATURE TYPE TAPE CASSETTE

BACKGROUND OF THE INVENTION

The present invention generally relates to a miniature type tape cassette which is loaded in a state accommodated within a tape cassette adapter having the same external form and size as a standard type tape cassette with respect to a standard type recording and/or reproducing apparatus which is primarily designed to perform recording and/or reproduction with a standard type tape cassette, and loaded independently with respect to a recording and/or reproducing apparatus of a type different from the standard type recording and/or reproducing apparatus. More particularly, the present invention relates to a miniature type tape cassette having a construction such that the tape cassette is prevented from being taken out of the tape cassette adapter when the tape cassette is accommodated within the tape cassette adapter in a state where a tape is drawn out of a cassette case of the tape cassette.

Presently, video signal recording and/or reproducing apparatuses using tape cassettes are reduced to practical use on the world-wide basis. As types of these recording and/or reproducing apparatuses using tape cassettes, two or three standardized types of apparatuses presently exist world-widely. There is no interchangeability between apparatuses of different standards, however, the interchangeability exists between apparatuses adopting the same standard. Accordingly, a tape cassette recorded by one recording and/or reproducing apparatus can be reproduced by another recording and/or reproducing apparatus of the same standard. Hence, in order to ensure the interchangeability between different recording and/or reproducing apparatuses manufactured by different manufacturers so as to perform recording and/or reproduction, a standardization is established with respect to formats of the tape cassette and the recording and/or reproducing apparatus. That is, the above formats are standardized for each standard, and a standard type tape cassette and a standard type recording and/or reproducing apparatus are respectively manufactured and marketed under each standard.

Recently, a problem of much importance involves the realization in reducing the size of the recording and/or reproducing apparatus main body. This is to realize a more compact portable type recording and/or reproducing apparatus, and, for example, to realize such an equipment that a recording apparatus is unitarily built into a television camera.

In this regard, some attempts have been made to realize a compact type recording and/or reproducing apparatus using a compact or miniature type tape cassette, which uses a tape pattern and format completely different from those of the standard type recording and/or reproducing apparatus using the standard type tape cassette which are already and widely accepted in the market. However, the above compact type recording and/or reproducing apparatus attempted for realization uses a format completely different from that of the standard type recording and/or reproducing apparatus, and the interchangeability does not exist therebetween. Therefore, in this compact type recording and/or reproducing apparatus, there is a disadvantage in that a tape cassette recorded by the compact type recording and/or reproducing apparatus cannot be reproduced by the standard type recording and/or reproducing apparatus. This is a great inconvenience and disadvantage to the owners of the compact type recording and/or reproducing apparatus.

Another attempt has also been made to realize a compact type portable recording and/or reproducing apparatus which performs recording and/or reproduction with the same tape pattern and format as the standard type recording and/or reproducing apparatus, by using a tape cassette whose size is slightly reduced by reducing the tape quantity and the diameter of the reels from those of the standard type tape cassette. In this system, a tape cassette recorded by the portable recording and/or reproducing apparatus can be reproduced as it is by the standard type recording and/or reproducing apparatus.

However, in the tape cassette used in the above portable recording and/or reproducing apparatus, the distance between a supply side reel and a take-up side reel is set equal to the distance between the supply side and take-up side reels of the standard type tape cassette, so that the tape cassette used for the portable recording and/or reproducing apparatus can be loaded into the standard type recording and/or reproducing apparatus. Hence, even when the tape quantity is reduced in order to reduce the diameter of the reels there is a limit in reducing the diameter of these reels. Therefore, in this system, there was a disadvantage in that the size of the tape cassette as a whole could not be reduced significantly, and the same is true to the recording and/or reproducing apparatus.

Furthermore, another system is conceivable in which the tape quantity is reduced to reduce the diameter of the reels, and further, the miniature type tape cassette is constructed by reducing the distance between the supply side and take-up side reels. In this system, as a modification of the standard type recording and/or reproducing apparatus, the recording and/or reproducing apparatus can be constructed so that a reel disc for driving the take-up side reel is movable. In this modification of the standard type recording and/or reproducing apparatus, the take-up side reel disc is at a normal position when loaded with the standard type tape cassette, and the take-up side reel disc is moved to a position closer to the supply side reel disc when loaded with the miniature type tape cassette.

However, even in this system, for example, there is a disadvantage in that the miniature type tape cassette recorded by the compact type recording and/or reproducing apparatus cannot be reproduced by the standard type recording and/or reproducing apparatus which is presently in wide use. Moreover, there is a disadvantage in that it is extremely difficult to realize a mechanism for moving the reel disc in the manner described above. Furthermore, the recording and/or reproducing apparatus using the tape cassette generally has a mechanism for drawing out the tape from inside the tape cassette to load the tape onto a predetermined tape path within the recording and/or reproducing apparatus. Therefore, it is also exceedingly difficult to construct the above mechanism for pulling out the tape, so that interchangeability exists with respect to the above compact or miniature type tape cassette and the standard type tape cassette. Practically, the realization of such a mechanism is virtually impossible.

SUMMARY OF THE INVENTION

Accordingly, it is a general object of the present invention to provide a novel and useful miniature type tape cassette in which the above described disadvantages have been overcome.

Another and more specific object of the present invention is to provide a miniature type tape cassette which is loaded, in a state accommodated within a tape cassette adapter having substantially the same external form and size as a standard type tape cassette, with respect to a standard type tape recording and/or reproducing apparatus which is primarily designed to perform recording and/or reproduction with a standard type tape cassette, in a state where the tape is drawn out from a cassette case to form a predetermined tape path, which miniature type tape cassette has a cutout part provided in the cassette case, so that a moving member provided on the tape cassette adapter, which moves in relation to the drawing out of the tape in the manner described above, engages with the cutout part. According to the miniature type tape cassette of the present invention, when the miniature type tape cassette is accommodated within the tape cassette adapter in a state where the tape is drawn out of the cassette case, even when an attempt is made to erroneously take out the miniature type tape cassette from the tape cassette adapter, the miniature type tape cassette is prevented from being taken out by the above moving member of the tape cassette adapter since the moving member engages with the cutout part of the cassette case. Hence, accidental removal of the miniature type tape cassette from the tape cassette adapter to damage the tape extended outside the cassette case, is prevented.

Other objects and further features of the present invention will be apparent from the following detailed description when read in conjunction with the accompanying drawings.

BRIEF DESCRIPTION OF THE DRAWINGS

FIG. 1 is a perspective view showing a miniature type tape cassette according to the present invention in a state where a tape protecting lid is open, viewed from a lower direction with respect to the front of the tape cassette;

FIGS. 2A, 2B, 2C, and 2D are diagrams respectively showing a plan view, a side view, a bottom view, and a rear view of the tape cassette shown in FIG. 1;

FIG. 4 is a diagram showing a cross section along a line IV—IV in FIG. 2A;

FIGS. 5A and 5B are diagrams respectively showing a plan view and a front view of an embodiment of a leaf spring for pushing against a reel;

FIGS. 6A and 6B are diagrams respectively showing cross sections along a line VIA—VIA and a line VIB—VIB in FIG. 3, in a state where a fixed shaft of a take-up side reel and an engaging part of a lower half are disassembled;

FIG. 7 is a side view showing the shape of teeth around the periphery of a lower flange of a take-up side reel in an enlarged scale;

FIG. 8 is a diagram showing a braking mechanism with respect to a take-up side reel, in a cross section along a line VIII—VIII in FIG. 3;

FIG. 9 is a perspective view showing an example of a tape cassette adapter into which the tape cassette shown in FIG. 1 is loaded;

FIG. 11 is a diagram showing a cross section along a line XI—XI in FIG. 10 in a state where latching mechanisms for an upper half and a lower half of the tape cassette adapter are mutually opposed;

FIG. 12 is a side view showing a mechanism for temporarily opening an opening and closing lid when an upper half of the tape cassette adapter is placed on top of a lower half;

FIG. 13 is a diagram showing the tape cassette adapter shown in FIG. 9 in a vertical cross section;

FIG. 14 is a side view showing the shape of teeth of an intermediate gear shown in FIG. 10 in an enlarged scale;

FIGS. 22 and 23 are diagrams respectively showing a plan view and a side view of a tape cassette adapter in a state where a rear lid is open.

DETAILED DESCRIPTION

Figure 2C:
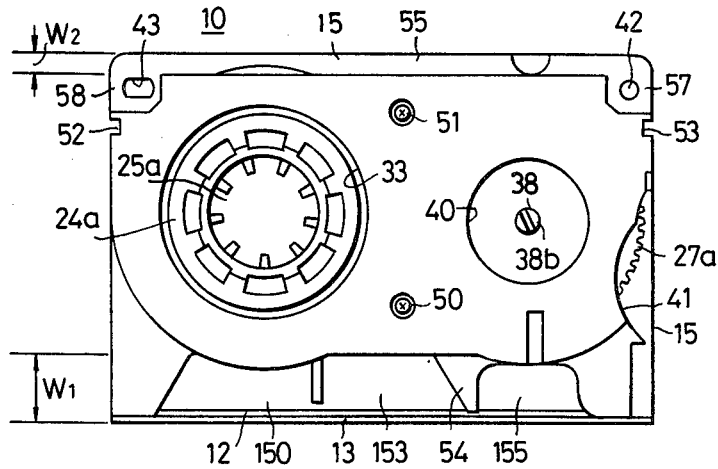

A miniature type tape cassette 10 according to the present invention has a configuration shown in FIGS. 1, 2A through 2D, 3, and 4. The tape cassette 10 has a cassette case 11 of a size smaller than a standard type tape cassette which is loaded into a standard type recording and/or reproducing apparatus. A lid 13 for protecting a magnetic tape 12 accommodated within the tape cassette 10, is provided on the front of the cassette case 11. The cassette 11 consists of an upper half 14 and a lower half 15.

A part of a rectangular-shaped side flange part 13a of the lid 13 is axially supported by a hinge pin 16 at a part in the vicinity of a corner part of the upper half 14, so that the lid 13 is rotatable to open and close. A substantially U-shaped leaf spring 17 and a slide rod 18 which is urged in the direction of the hinge pin 16 by the leaf spring 17, are provided in relation to the above lid 13. The lid 13 can assume two states. That is, in one state, one side edge 13b of the flange part 13a is pushed by the slide rod 18, and the lid 13 is in a closed state shown in FIG. 2B. Further, in another state, another side edge 13c of the flange part 13a is pushed by the slide rod 18, and the lid 13 is an open state shown in FIG. 1 and as indicated by a two-dot chain line in FIG. 2B. The U-shaped leaf spring 17 is fitted into a side groove 19 of the upper half 14, in a state where the leaf spring 17 is held by a projecting rib 19a and does not easily detach from the side groove 19. The slide rod 18 is provided within a groove 20 at the side of the upper half 14, in a freely slidable manner. Moreover, when the tape cassette 10 is not loaded into a recording and/or reproducing apparatus designed exclusively for the tape cassette 10 or accommodated within a tape cassette adapter (description with respect to the recording and/or reproducing apparatus designed exclusively for the tape cassette 10 and the tape cassette adapter will be given afterwards), the lid 13 covers the front of the cassette case 11 to protect the magnetic tape 12 which is exposed at the front of the cassette case 11.

Figure 3:
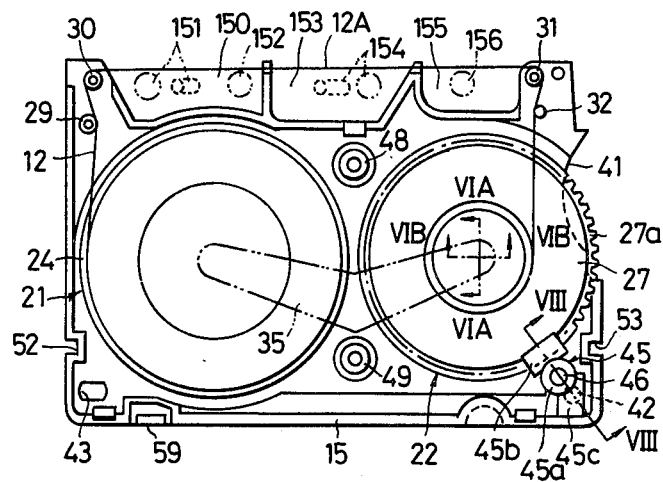
FIG. 3 is a plan view showing the inner construction of the tape cassette shown in FIG. 1 in a state where an upper half of a cassette case and an upper flange of a reel are removed.

In addition, as shown in FIGS. 3 and 4, a supply side reel (supply reel) 21 and a take-up side reel (take-up reel) 22 are provided side by side within the cassette case 11. A distance D between centers of the reels 21 and 22 is shorter than the distance between centers of supply and take-up reels of a standard type tape cassette used with respect to a standard type recording and/or reproducing apparatus. With respect to the supply reel 21, the magnetic tape 12 is wound around a reel hub 25 between upper and lower flanges 23 and 24 Similarly, the magnetic tape 12 is wound around a reel hub 28 between upper and lower flanges 26 and 27, with respect to the take-up reel 22. The magnetic tape 12 is unwound from the supply reel 21 and guided by guide poles 29, 30, 31, and 32 provided at left and right end sides, along the front side of the cassette case 11, to form a tape path 12A reaching the take-up reel 22.

The supply reel 21 is provided in a state where an annular projecting step portion 24a of the lower flange 24 is loosely fitted into a hole 33 having a large diameter of the lower half 15. Moreover, teeth 24b are formed in a ring shape on the lower surface of the lower flange 24 around the entire circular periphery thereof. Teeth 34 are formed in a ring shape on the upper surface of the lower half 15, at positions opposing the above teeth 24b. The supply reel 21 is urged downwards to the lower half 15, by one arm portion 35a of a leaf spring 35 mounted on the lower surface of an upper plate of the upper half 14. Accordingly, in a normal state, the teeth 24b mesh with the teeth 34. Hence, the supply reel 21 is braked and prevented from free rotation, due to the above meshing of the teeth 24b and 34. Thus, the supply reel 21 does not unnecessarily rotate while the tape cassette 10 is manipulated or in transit. Therefore, the magnetic tape 12 is prevented from being tangled and damaged, since slack is not introduced in the magnetic tape 12 which is wound around the supply reel 21, and the magnetic tape 12 is prevented from being pulled unnecessarily out from the supply reel 21.

A reel driving shaft inserting part 25a is provided inside the reel hub 25 of the supply reel 21, into which a reel driving shaft of the recording and/or reproducing apparatus is inserted. The inner diameter of the above reel hub 25 is equal to the inner diameter of a reel driving shaft inserting part of a supply reel in the standard type tape cassette.

The take-up reel 22 is provided in a rotatable manner such that a fixed shaft 36 embedded in the lower half 15 is inserted into a center hole of the reel hub 28. The above take-up reel 22 is urged towards the lower half 15 by being pushed downwards by another arm portion 35b of the leaf spring 35. Since the reel hub 28 is not inserted with a reel driving shaft, an outer diameter d2 of the reel hub 28 is smaller than an outer diameter d1 of the reel hub 25 of the supply reel 21. Accordingly, the amount of magnetic tape 12 which can be accommodated within the tape cassette 10 becomes large as compared to the case where the outer diameters d1 and d2 of the reel hubs 25 and 28 are the same. Therefore, although the size of the tape cassette 10 is small, recording and reproduction can be performed for a relatively long period of time by use of the above tape cassette 10.

As shown in FIGS. 5A and 5B, the above leaf spring 35 is of a V-shape and is adhered and fixed in a state where a pair of holes 35c at the center thereof is fitted over projections at the lower surface of the upper plate of the upper half 14. The leaf spring 35 is shaped so that, in a free state, a bent amount s of the arm portion 35a which makes contact with the supply reel 21 is larger than a bent amount t of the other arm portion 35b which makes contact with the take-up reel 22. Hence, the resilient force exerted by the arm portion 35a is especially large. When the tape cassette 10 is not used, the supply reel 21 is pushed against the lower half 15 with a strong force, and the rotation of the supply reel 21 is positively prevented. On the other hand, when the tape cassette 10 is being used, the position of the supply reel 21 is positively secured by a supply reel driving shaft, to stabilize the magnetic tape travel.

The above fixed shaft 36 is screwed onto the lower half 15 with a screw 38, in a state where a projection 37 provided on the lower half 15 is inserted into a linear groove 36a at the lower end part of the fixed shaft 36 as shown in FIGS. 6A and 6B. The above groove 36a and the projection 37 act as a detent when the projection 37 is inserted into the groove 36a, upon mounting the fixed shaft 36 onto the lower half 15 by the screw 38. Hence, the screw 38 can be screwed securely into the fixed shaft 36, and the operation to fix the fixed shaft 36 onto the lower half 15 can be performed with high operation efficiency. During recording and reproducing operations, a rotational force of the take-up reel 22 acts on the fixed shaft 36. However, the fixed shaft 36 does not rotate unnecessarily, due to the engagement of the projection 37 and the groove 36a. Accordingly, the screw 38 does not become loose since the fixed shaft 36 is maintained in the initial fixed state without introducing instability in the fixed shaft 36. Therefore, the take-up reel 22 is maintained at a predetermined position and rotates in a stable manner Thus, the magnetic tape 12 can be smoothly taken up by the take-up reel 22 without damaging the magnetic tape 12, and the take-up reel 22 smoothly engages with a driving force transmitting mechanism as will be described hereinafter.

The screw 38 has a head part having a shape which is a combination of a circular truncated cone shape part 38a and a columnar part 38b. The part 38a of the above screw 38 is fitted over a tapered hole 39 in the lower half 15, in a state where the screw 38 is screwed into a threaded part 36b of the fixed shaft 36. In this state, the columnar part 38b of the screw 38 is positioned so that the center thereof accurately coincides with the center of rotation of the take-up reel 22. The above columnar part 38b functions as an engaging part for positioning, when the tape cassette 10 is accommodated within the tape cassette adapter.

A circular depression 40 is formed in a bottom surface 11a of the cassette case 11, that is, in the bottom surface of the lower half 15, around the periphery of a position corresponding to the center of rotation of the take-up reel 22. The above described columnar part 38b projects downwards from a bottom surface 40a of the circular depression 40 in a manner such that the columnar part 38b does not project from the bottom surface 11a of the whole cassette case 11. Since the columnar part 38b does not project from the bottom surface of the cassette case 11, the tape cassette 10 can be placed in a stable state on a table, for example. Moreover, the surface of the table is prevented from being scratched by the columnar part 38b.

In addition, gear teeth 27a are formed on the entire outer peripheral part of the lower flange 27 of the take-up reel 22. As shown in FIGS. 1, 2B, 2C, 3, and 4, a part of the outer peripheral part of the lower flange 27 is exposed through a cutout window 41 which extends from the side to the bottom of the lower half 15. The above cutout window 41 is of an arcuate shape on the bottom of the lower half 15. Further, as shown in FIG. 7, the lower end side of the above gear teeth 27a are tapered shapes.

Furthermore, with respect to the take-up reel 22, a braking mechanism shown in FIGS. 3 and 8 is provided. A braking member 45 consists of a brake shoe part 45b provided on one side of a cylindrical part 45a, and a rectangular engaging part 45c provided on the opposite side of the cylindrical part 45a. The above braking member 45 is provided in a state where the cylindrical part 45a is fitted over a projecting column 46 on the lower half 15, the brake shoe part 45b opposes an outer peripheral edge part at the upper surface of the reel flange 27, and the engaging part 45c is positioned at a corner part of the lower half 15. The braking member 45 is restricted of rotation, especially since the engaging part 45c is positioned at the corner part of the lower half 15. Moreover, the braking member 45 is urged towards the lower half 15 by a compressed coil spring 47 fitted over around the periphery of the projecting column 46, and the brake shoe part 45b presses against the outer peripheral edge part at the upper surface of the reel flange 27. Accordingly, the take-up reel 22 is subjected to the braking action due to the force of friction introduced when the brake shoe part 45b presses against the outer peripheral edge part at the upper surface of the flange 27, and is stopped at this position. Thus, no slack is introduced in the magnetic tape 12 which is wound around the take-up reel 22. Furthermore, the engaging part 45c of the braking member 45 covers a positioning hole 42 formed in the lower half 15 which will be described hereinafter.

Since the take-up reel 22 is applied with the braking force only due to the force of friction introduced, the take-up reel 22 is capable of rotating when applied with a large rotational force. Accordingly, as will be described hereinafter, the magnetic tape 12 may be drawn out from the tape cassette 10 in a relatively easy manner, by rotating the take-up reel 22 towards a tape unwinding direction against the force exerted by the braking mechanism.

The above braking member 45 moves upwards along the projecting column 46 as will be described hereinafter, and in this raised state, the brake shoe part 45b disengages from the reel flange 27 in the upward direction, and the braking with respect to the take-up reel 22 is accordingly released. Since the braking member 45 operates by moving along the axial direction of the take-up reel 22, the braking member 45 does not hit against and damage the magnetic tape 12 wound around the take-up reel 22 as in the case where the braking member rotates within a plane which is an extension of the reel flange. Hence, the construction of the braking mechanism is simple. In addition, the above braking mechanism does not occupy much space, and is convenient for reducing the size of the tape cassette 10. Furthermore, since the braking mechanism including the braking member 45 is provided in a space at the corner part of the cassette case 11, additional space is not required for providing the braking mechanism. It is advantageous also from this point of view, when reducing the size of the tape cassette.

The braking mechanism may be assembled in a simple manner by successively fitting the braking member 45 and the coil spring 47 over the projecting column 46 after the take-up reel 22 is assembled into the lower half 15, and then, holding the vertex part of the coil spring 47 by covering the lower half 15 with the upper half 14.

The upper and lower halves 14 and 15 are fixed together by screws 50 and 51 in a state where the upper half 14 is positioned with respect to the lower half 15 by fitting projections 48 and 49 of the lower half 15 into corresponding depressions (not shown) of the upper half 14.

Grooves 52 and 53 extending in the direction of the height of the tape cassette, are respectively formed at positions closer to the rear side of the tape cassette, on the left and right side of the tape cassette 10. These grooves 52 and 53 operate together with projecting rims of the tape cassette adapter as will be described hereinafter, and have functions to prevent the tape cassette from being loaded into the tape cassette adapter facing the wrong direction.

Moreover, a depressed step part 54 having a width W1 and a depressed step part 55 having a width W2 are respectively formed on the lid side and on the rear side at the bottom surface of the tape cassette 10. The widths of the depressed step parts 54 and 55 are different so as to satisfy a relation W1>W2. In addition, a substantially semi-circular depressed step part 56 in the plan view, is formed at a central part in the upper surface of the tape cassette 10 facing to the rear. This depressed step part 56 engages with an engaging lever provided on the tape cassette adapter, as will be described hereinafter.

Figure 2E:
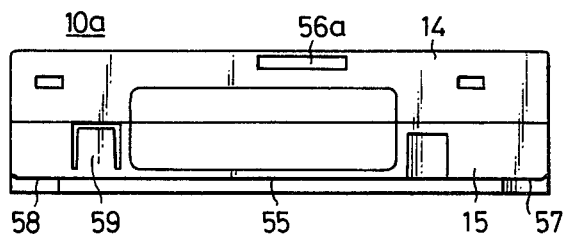
FIG. 2E is a rear view showing a modification of the tape cassette shown in FIG. 1.

FIG. 2E shows a miniature type tape cassette 10a which is a modification of the above described miniature type tape cassette. The tape cassette 10a has a depression 56a on the rear thereof, instead of the depressed step part 56. This depression 56a is of a substantially semi-circular shape in the direction of the width, similarly as in the case of the above depressed step part 56, and is inserted with and engages with the engaging lever provided on the tape cassette adapter. The above miniature type tape cassette 10a does not have any step at the upper surface thereof, since the depression 56a is used instead of the depressed step part 56.

FIGS. 9 through 13 show an example of a tape cassette adapter which is used when the miniature type tape cassette 10 having the above described construction is loaded into a standard type recording and/or reproducing apparatus.

A tape cassette adapter 60 has an accommodating part 61 for accommodating the above tape cassette 10, and has an external form and size substantially equal to those of the standard type tape cassette, similarly as in the case of tape cassette adapters which will be described hereinafter.

The tape cassette adapter 60 consists of a lower half 62 and an upper half 63, and these halves 62 and 63 are connected at the sides thereof by a hinge 64. The upper half 63 can pivot between an open position indicated in FIG. 10, and a closed position indicated in FIGS. 9 and 13 where the upper half 63 covers the upper surface of the lower half 62.

The above accommodating part 61 for accommodating the tape cassette 10 is formed at a predetermined position of the lower half 62. A rotation transmitting mechanism 65 is provided at a position adjacent to the accommodating part 61. When the lower half 62 is placed on top of the standard type tape cassette for comparison, the supply reel 21 of the tape cassette 10 accommodated within the accommodating part 61 is arranged at a position corresponding to the position of the supply reel of the standard type tape cassette. In addition, a gear structure 66 of the rotation transmitting mechanism 65 is arranged at a position corresponding to the position of the take-up reel of the standard type tape cassette.

The accommodating part 61 has a shape substantially identical to the plane shape of the tape cassette 10 in the plan view, and is a space surrounded by right and left side walls 68 and 67 and a rear wall 69 respectively opposing the right and left sides and the rear of the tape cassette 10 accommodated within the accommodating part 61 and a bottom plate 70 opposing the bottom of the tape cassette 10. Projecting ribs 71a and 71b which respectively fit into the grooves 52 and 53 of the tape cassette 10, are formed on the left and right walls 67 and 68. A circular hole 72 is provided in the bottom plate 70 at a position corresponding to the position of the supply reel of the tape cassette 10 which is accommodated. In addition, a cylindrical member 73 having a penetrating hole 73a is provided on the bottom plate 70 at a position corresponding to the position of the take-up reel of the tape cassette 10 which is accommodated (refer to FIG. 16). The diameter of the hole 73a is the same as that of the above described circular truncated cone shape part 38a of the screw 38, and a tapered part 73b is formed at the upper edge side of the hole 73a in order to facilitate the engagement with the part 38a. Moreover, a long and narrow projecting step part 75 is formed on the bottom plate 70 along the rear wall 69, and projecting step parts 76 and 77 are formed at corner parts between the rear wall 69 and the side walls 67 and 68. Projections 78 and 79 for positioning are respectively provided on the projecting step parts 76 and 77.

The rotation transmitting mechanism 65 consists of the gear structure 66 and an intermediate gear 80 having a small diameter which meshes with the above gear structure 66. As shown in FIG. 13, the gear structure 66 has a gear 66a at the flange part, and a reel driving shaft inserting part 66c within a central projecting part 66b. The gear structure 66 is arranged in a rotatable manner opposing a hole 81 at the bottom of the lower half 62. The above gear structure 66 is maintained at a predetermined position in a state where the gear structure 66 is free to move to a certain extent, by an arcuate wall 82 and an arm which will be described hereinafter which are provided on the lower half 62.

A ring-shaped holder 83 is fitted over the periphery of the central projecting part 66b of the gear structure 66 in a rotatable manner. The intermediate gear 80 is provided on a shaft 84 at the tip end of an arm part 83a of the holder 83. Tip ends of a swing arm 85 and a sliding arm 86 are linked together. The rotary arm 86 extends in a state inserted within a groove 70a provided on the upper surface of the bottom plate 70, and a base part thereof is fitted and fixed to the outer periphery of the cylindrical member 73. A ring-shaped holding member 74 is fixed onto the bottom plate 70 in a state covering the above groove 70a. The cylindrical member 73 is fitted into a hole 70b of the bottom plate 70 and a center hole of the ring-shaped holding member 74 in a rotatable manner, and the swing arm 85 can rotate unitarily with the cylindrical member 73.

The sliding arm 86 is linked with an arm 88 which is axially supported by a projecting beam on the lower half 62 at a base part thereof, in a freely slidable manner. Due to this construction, the gear structure 66 is capable of slightly changing the position thereof inside the arcuate wall 82, accompanying the swing of the arm 85 and the sliding of the arm 86. Since the intermediate gear 80 is supported at the tip end of the arm part 83a of the ring-shaped holder 83 and the tip end of the swing arm 85, the distance from the hole 73 and the distance from the center of the gear structure 66 with respect to the intermediate gear 80 do not vary and are maintained at constant values, regardless of the move in the position of the gear structure 66. Accordingly, even when the position of the gear structure 66 changes, the intermediate gear 80 remains in a state meshing with the gear 66a in a normal manner. Moreover, the intermediate gear 80 assumes a position where it is possible to mesh with teeth 27a provided on the tape cassette 10 which is accommodated within the tape cassette adapter 60.

As shown in FIG. 14 in an enlarged scale, teeth 89 of the intermediate gear 80 respectively have a tapered part 89a at the upper end side thereof. Hence, as will be described hereinafter, the teeth 27a can positively mesh with the teeth 89 of the intermediate gear 80.

Similarly as in the standard type tape cassette, cutouts 90 and 91 for inserting loading poles, and a cutout 92 and the like for inserting a capstan, are respectively provided in the front part of the lower half 62.

Furthermore, guide poles 93 and 94 are embeddedly provided at the end of the above cutout 90 and at the end of the cutout 92, respectively, in the lower half 62. As will be described hereinafter, the guide poles 93 and 94 guide the magnetic tape 12 so that the magnetic tape 12 forms a tape path 12B along the front surface of the tape cassette adapter 60.

Moreover, a cutout 95 for inserting a lid opening lever, openings 96a and 96b for inserting positioning pins, an opening 97 for inserting a light emitting source for detecting the end of the magnetic tape 12, an opening 98 for inserting a reel brake releasing pin, and the like are provided in the lower half 62.

An opening and closing lid 100 is provided at the front surface side of the upper half 63. The lid 100 is of a shape identical to the opening and closing lid of the standard type tape cassette. The lid 100 is supported at the right and left sides, and is constantly urged towards a lid closing direction by the action of a spring 102 provided on a shaft 101.

In addition, a leaf spring 103 is mounted on the upper half 63, to make contact with and push against a central projection 66d of the gear structure 66 when the upper half 63 is closed. A transparent plate 104 is adhered onto a part of the upper half 63 which opposes the tape cassette accommodating part 61 when the upper half 63 is closed. Further, a rectangular opening 105 for receiving the lid 13 of the tape cassette 10, is formed in the upper half 63 between the transparent plate 104 and the lid 100.

Next, description will be given with respect to the manipulation and operation involved in a case where the above described tape cassette 10 loaded to the standard type recording and/or reproducing apparatus together with the tape cassette adapter 60, by referring to FIGS. 15 through 17.

In this case, the tape cassette 10 is accommodated within the tape cassette adapter 60 to form the above described predetermined tape path within the tape cassette adapter 60. This tape cassette adapter 60 accommodating the tape cassette 10 is loaded into the standard type recording and/or reproducing apparatus as in the case where the standard type tape cassette is loaded.

Figure 10:
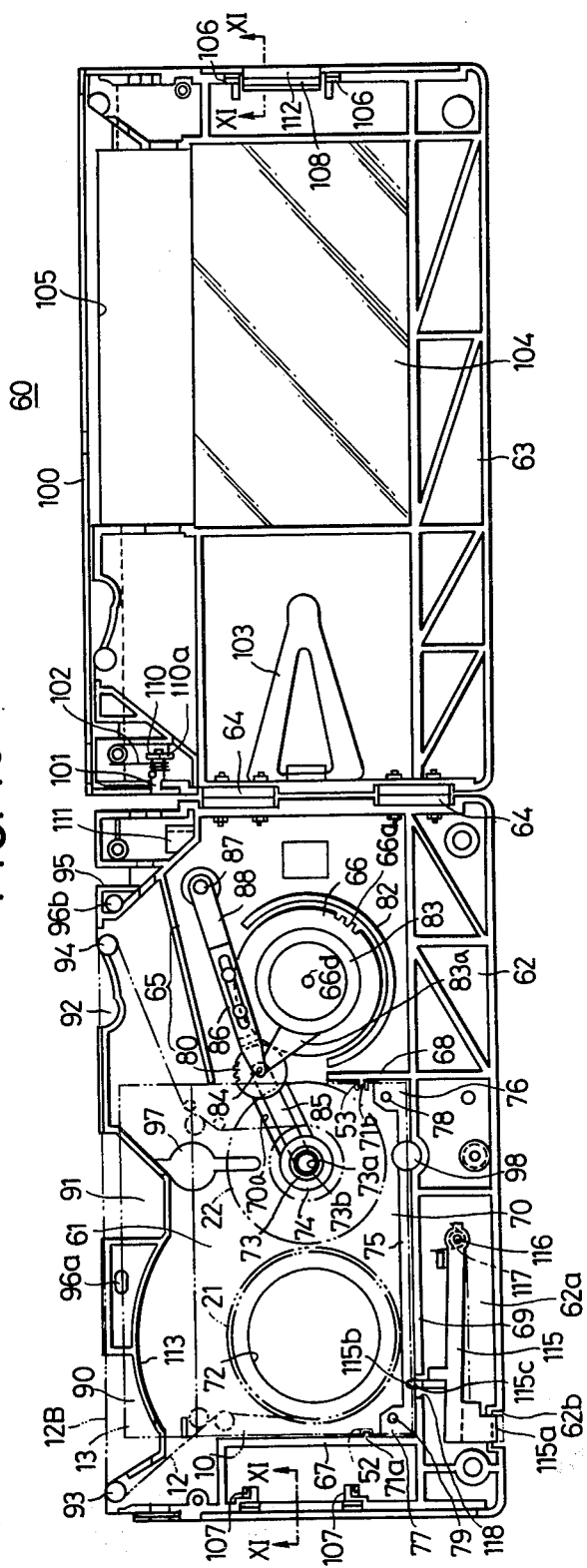
FIG. 10 is a plan view showing the tape cassette adapter shown in FIG. 9 in a state where an upper half is open with respect to a lower half.

In order to accommodate the tape cassette 10 within the tape cassette adapter 60, the lid 13 of the tape cassette 10 is first opened as shown in FIG. 1. Then, the magnetic tape 12 is drawn out from the tape cassette 10 by a predetermined length. In this state, the magnetic tape 12 can be drawn out from the take-up reel 22 by rotating the take-up reel 22 against the braking force of friction, and it is not necessary to push the supply reel 21 upwards by a finger in order to release the braking effect. In addition, it is not necessary to hold the lid 13 in the open position by a finger, since the lid 13 is mechanically held at the open position. Hence, the manipulation to draw out the magnetic tape 12 from the above tape cassette 10, and the succeeding manipulation to accommodate the tape cassette 10 within the tape cassette adapter 60, can be performed with ease. In the state where the magnetic tape 12 is drawn out from the tape cassette 10, the tape cassette 10 is accommodated within the accommodating part 61 in the lower half 62, and the magnetic tape 12 which is drawn out is threaded around the guide poles 93 and 94 so as to be guided by these guide poles 93 and 94 as shown in FIG. 10. Accordingly, the magnetic tape 12 is guided by these guide poles 93 and 94, and forms the tape path 12B traversing the front surfaces of the cutouts 90, 91, and 92, as in the case of the standard type tape cassette. In a case where the lid 13 is transparent, it is possible to see the position of the magnetic tape 12 through the lid 13, and the operation to thread the magnetic tape 12 can be performed in a simple manner without making a mistake.

The upper half 63 is then rotated about the hinge 64 and closed. The upper half 63 is connected to the lower half 62 in this state where the upper half 63 covers the lower half 62. A clawed part 108 of the upper half 63 engages with a cutout groove 109 of the lower half 62, and the upper and lower halves 63 and 62 are locked in a state where guiding projections 106 and 107 of the upper and lower halves 63 and 62 make contact with each other to restrict positions of the upper and lower halves 63 and 62. Therefore, as shown in FIG. 15, the tape cassette adapter 60 is in a state where the tape cassette 10 is accommodated between the upper and lower halves 63 and 62 and the magnetic tape 12 drawn out from the tape cassette 10 is guided along the predetermined tape path 12B.

When the upper half 63 pivots from a position slightly before a final position unto the final position, sloping cam surfaces 110a and 110b of an arm 110 which is unitarily provided on the shaft 101 are guided by an L-shaped projection 111 provided on the lower half 62, as shown in FIG. 12. Thus, the lid 100 is once slightly opened as indicated by a two-dot chain line in FIG. 12 and departs from the magnetic tape 12 in the tape path 12B, and in a final stage, the lid 100 closes to cover the front surface of the tape cassette adapter 60. Therefore, when the upper half 63 is manipulated to cover the lower half 62, no inconveniences are introduced since the lid 100 does not hit the magnetic tape 12 in the tape path 12B to undesirably deform the magnetic tape 12. Further, the lock between the upper and lower halves 63 and 62 can be released by pushing a projection 112.

Next, description will be given with respect to the operation of each part when the tape cassette 10 is accommodated within the accommodating part 61 of the tape cassette adapter 60.

The tape cassette 10 is placed on a position where the tape cassette 10 makes contact with the bottom plate 70 facing a predetermined direction, in a state where the grooves 52 and 53 provided on the tape cassette 10 are fitted over the projecting ribs 71a and 71b of the tape cassette adapter 60. Hence, the depressed step part 55 at the bottom surface and the depressed step parts 57 and 58 of the tape cassette 10 respectively make contact with the long and narrow projecting step part 75 and the projecting step parts 76 and 77 provided on the bottom plate 70 of the tape cassette adapter 60, and the tape cassette 10 is accordingly positioned with respect to the direction of its height. In addition, the hole 42 and a longitudinal hole 43 provided in the lower half 15 of the tape cassette 10 respectively fit over the projections 78 and 79. Moreover, as shown in an enlarged scale in FIG. 16, the columnar part 38b of the screw 38 fits into the hole 73a. Accordingly, the tape cassette 10 is accurately positioned since the tape cassette 10 is restricted of its position at three positions. Furthermore, since the columnar part 38b provided at the center position of the take-up reel 22 fits into the hole 73a, the take-up reel 22 is positioned at a predetermined position with respect to the rotation transmitting mechanism 65 with high accuracy, and the take-up reel 22 can engage with the rotation transmitting mechanism 65 in an accurate manner. Due to the function of the tapered part 73b provided at the upper end of the hole 73a, the columnar part 38b of the screw 38 can smoothly enter into the hole 73a.

The teeth 27a of the lower flange 27 which is exposed through the cutout window 41 at the take-up reel 22, mesh with the teeth 89 of the intermediate gear 80 when the tape cassette 10 is lowered. Since the tapered parts 27b and 89a are respectively formed at the upper and lower parts of the teeth 27a and 89 opposing each other (refer to FIGS. 7 and 14), the teeth 27a smoothly meshes with the teeth 89 by being guided by the tapered parts 27b and 89a, regardless of any rotational position of the take-up reel 22 and the intermediate gear 80.

The pin 78 passes through the hole 42 to push the engaging part 45c. Hence, as indicated by a two-dot chain line in FIG. 8, the pin 78 pushes the braking member 45 upwards against the force exerted by the coil spring 47, that is, towards the axial direction of the take-up reel 22. Therefore, the brake shoe part 45b disengages from the lower flange 27, and the take-up reel 22 is released of the braking operation.

When an attempt is made to erroneously accommodate the tape cassette 10 with the lid side and the rear side facing the wrong direction, the grooves 52 and 53 do not mutually match the projecting ribs 71a and 71b.

Thus, the right and left end sides at the bottom surface of the cassette 10 are obstructed by the projecting ribs 71b and 71a, and the tape cassette 10 cannot be accommodated within the accommodating part 61. That is, the tape cassette 10 is positively prevented from being accommodated in a state facing the wrong direction.

When the upper half 63 is placed on top of the lower half 62 to cover the lower half 62, the upper surface of the tape cassette 10 is pushed by the transparent plate 104 as shown in FIG. 13. Hence, the tape cassette 10 is accommodated within the accommodating part 61 and restricted from moving therefrom. The lid 13 which is in a horizontal state enters within the opening 105. Accordingly, the upper surface of the tape cassette adapter 60 is covered by the lid 13 which enters within the opening 105 to form a flush top of the tape cassette adapter 60. Therefore, the above tape cassette adapter 60 can also be applied with respect to a reproducing apparatus provided with a tape cassette automatic loading mechanism without interfering with the operation. Further, the leaf spring 103 engages with the projection 66d of the gear structure 66, to push the gear structure 66 downwards against the lower half 62.

Figure 15:
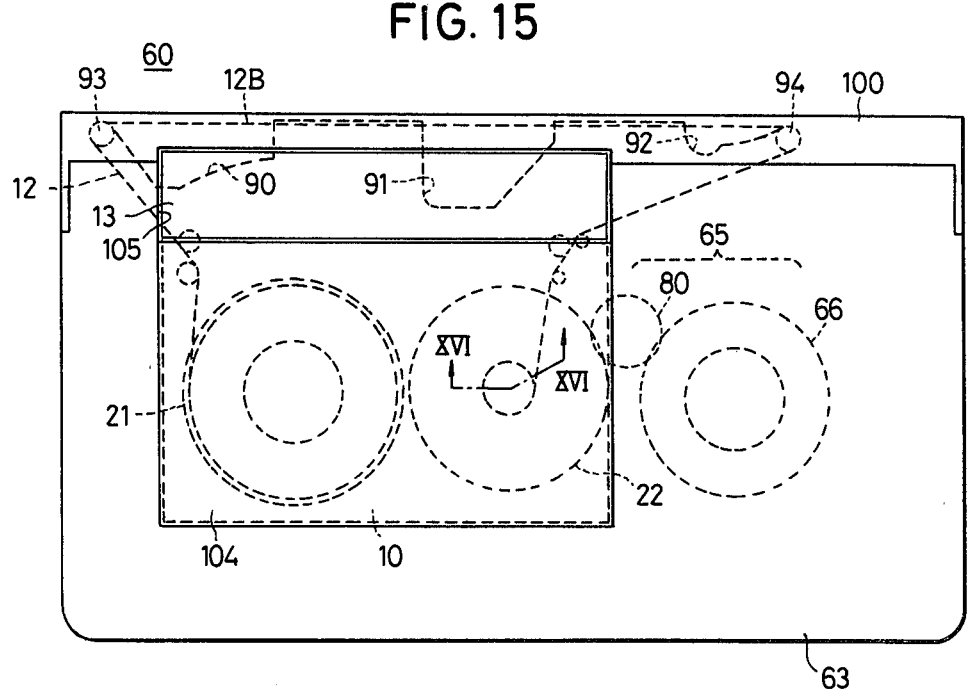
FIG. 15 is a plan view showing a tape cassette adapter in a state accommodating a tape cassette.
Figure 16:
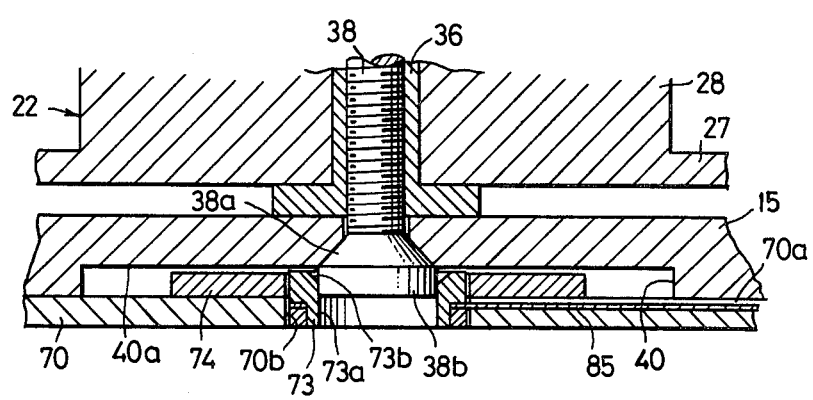
FIG. 16 is a diagram showing a mechanism for positioning a tape cassette within an adapter in an enlarged scale, in a cross section along a line XVI—XVI in FIG. 15.

By performing the above described operations, the tape cassette 10 can be accommodated within the tape cassette adapter 60 as shown in FIG. 15.

Figure 17:
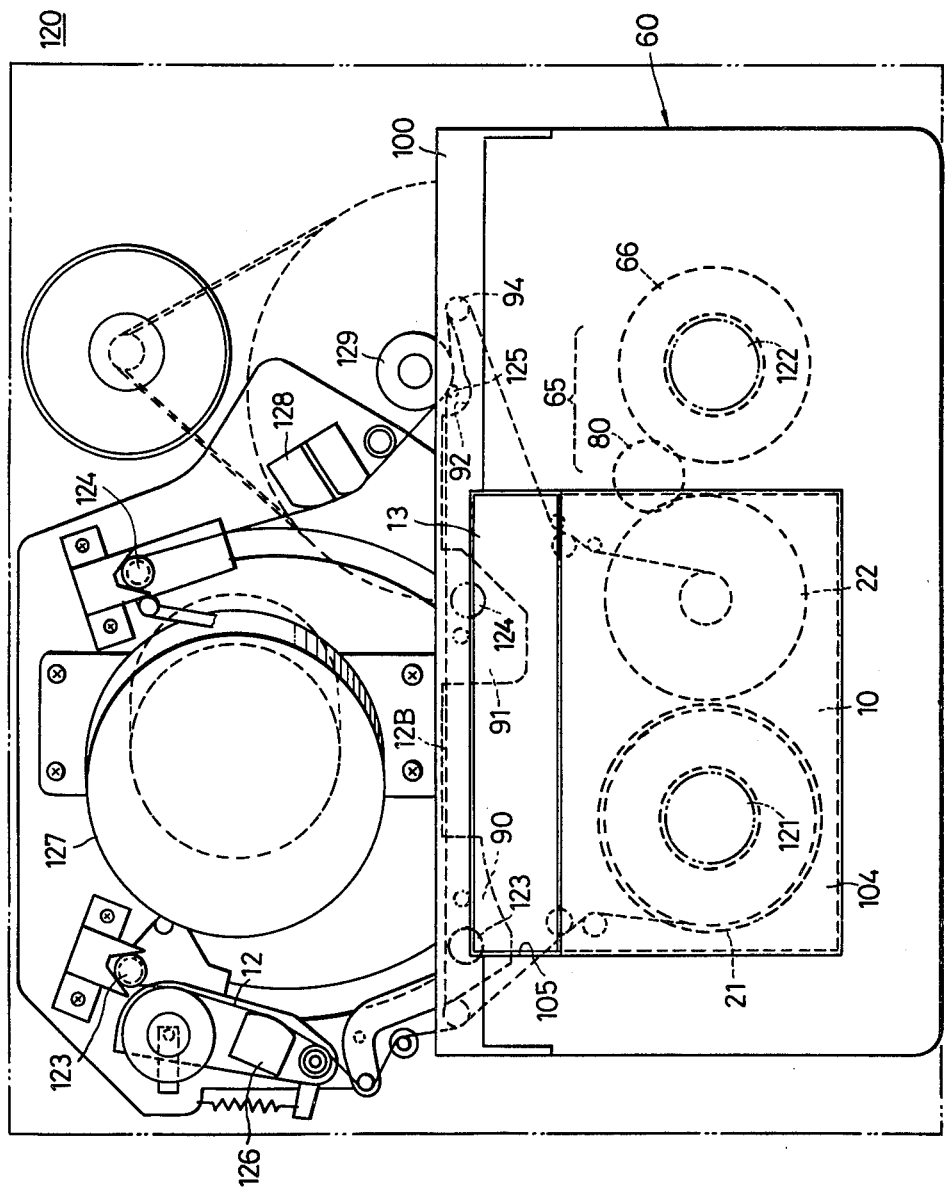
FIG. 17 is a plan view showing an example of a standard type recording and/or reproducing apparatus loaded with a tape cassette adapter which is accommodating a tape cassette, in a recording or reproducing mode.

As shown in FIG. 17, the tape cassette adapter 60 accommodating the tape cassette 10 is loaded into a standard type recording and/or reproducing apparatus 120, similarly as in the case where the standard type tape cassette is loaded.

That is, by loading the tape cassette adapter 60, a supply reel driving shaft 121 is inserted into the reel driving shaft inserting part 25a of the supply reel 21 of the tape cassette 10. On the other hand, a take-up reel driving shaft 122 is inserted into the reel driving shaft inserting part 66c of the gear structure 66 within the tape cassette adapter 60. In addition, loading poles 123 and 124 and a capstan 125 respectively enter into the cutouts 90, 91, and 92 behind the tape path 12B so as to oppose the inner side of the tape path 12B. In addition, in the above loaded state, the supply reel 21 is pushed upwards as shown in FIG. 3. Accordingly, the teeth 24b disengage from the teeth 34, and the supply reel 21 becomes freely rotatable. The take-up reel 22 is released of the braking operation in a state where the tape cassette 10 is accommodated within the tape cassette adapter 60, and is already in a freely rotatable state.

When the take-up reel driving shaft 122 enters within the gear structure 66, the gear structure 66 has a play in the horizontal plane, to become aligned with the take-up reel driving shaft 122. Even in a case where the gear structure 66 is displaced, the distance between the gear structure 66 of the rotation transmitting mechanism 65 and the intermediate gear 80, and the distance between the intermediate gear 80 and the take-up reel 22 respectively are kept constant. Thus, the rotation of the gear structure 66 is smoothly transmitted to the take-up reel 22.

Upon a tape loading operation, the above loading poles 123 and 124 respectively intercept and engage with the magnetic tape 12, then draw the magnetic tape 12 out of the cassette as the loading poles 123 and 124 move away from the cutouts 90 and 91, and reach positions indicated by solid lines in FIG. 17. Accordingly, the magnetic tape 12 which is drawn outside the tape cassette adapter 60, makes contact with a full-width erasing head 126, and makes contact with a guide drum 127 provided with rotary video heads throughout a predetermined angular range. The magnetic tape 12 further makes contact with an audio and control head 128. Therefore, the above magnetic tape 12 is loaded onto a predetermined tape travelling path.

During recording and reproduction, the magnetic tape 12 is driven in a state pinched between the capstan 125 and a pinch roller 129. Moreover, the gear structure 66 within the tape cassette adapter 60 is rotated in the clockwise direction by the take-up reel driving shaft 122. This rotation of the gear structure 66 is transmitted to the take-up reel 22 through the intermediate gear 80, to drive the magnetic tape 12 towards a tape take-up direction. Accordingly, the magnetic tape 12 fed out by the capstan 125 is taken-up by the take-up reel 22. The magnetic tape 12 is guided by the guide pole 94 within the tape cassette adapter 60.

In this state, the intermediate gear 80 is not pushed against the gear structure 66 and the take-up reel 22 by the action of the spring and the like, thus the extra load produced upon rotation transmission between the gears is kept small. Hence, when the take-up reel driving shaft 122 is rotating, the torque loss introduced during the rotation is reduced. The rotation of the take-up reel driving shaft is thus transmitted to the take-up reel 22, and the take-up reel 22 rotates with a sufficient torque to take-up the magnetic tape 12. As described above, the rotation transmitting mechanism 65 is constructed to transmit rotation with reduced torque loss. Therefore, even in a state where the tape cassette 10 is accommodated within the tape cassette adapter 60 and the tape cassette adapter 60 is loaded into the standard type recording and/or reproducing apparatus, the take-up reel 22 of the tape cassette 10 can rotate in a normal manner.

As shown in FIG. 10, an erroneous erasure preventing lever 115 is assembled within a space 62a at the rear of the tape cassette accommodating part 61 of the lower half 62. This lever 115 is axially supported by a projecting pin 116, and is urged to rotate clockwise by a coil spring 117. A tab 115a which is a downwardly bent part facing the rear of the tape cassette adapter 60, and a detecting projection 115b facing to the inside of the accommodating part 61, are respectively provided at the tip end of the lever 115. The tab 115a enters within a depression 62b of the lower half 62, and is exposed at a position on the rear surface of the tape cassette adapter 60 corresponding to the position of an erroneous erasure preventing tab of the standard type tape cassette. The detecting projection 115b passes through an opening 118 provided in the rear surface wall 69 of the tape cassette adapter 60, and protrude into the accommodating part 61. Hence, the detecting projection 115b is at a position opposing an erroneous erasure preventing tab 59 of the tape cassette 10 accommodated within the accommodating part 61. The tip end of the detecting projection 115b is formed as a sloping surface 115c which slopes downwards. Accordingly, when the tape cassette 10 is lowered to be accommodated within the accommodating part 61, the bottom of the tape cassette 10 pushes the detecting projection 115b so that the detecting projection 115b recedes to the space 62a.

In FIG. 10, in a case where the tape cassette 10 still having the tab 59 is accommodated within the tape cassette adapter 60, the detecting projection 115b of the lever 115 is pushed by the tab 59. Hence, the lever 115 rotates counterclockwise as indicated by a two-dot chain line in FIG. 10, against the force exerted by the spring 117. As indicated by the two-dot chain line in FIG. 10, the tab 115a moves so as to move away from the depression 62b to reach the entrance part of the depression 62b. Thus, the tab 115a does not project from the rear surface of the tape cassette adapter 60 and lies on the same plane as the rear surface of the tape cassette adapter 60, to function in a similar manner as the erroneous erasure preventing tab of the standard type tape cassette. That is, when the tape cassette adapter 60 in this state is loaded into the standard type recording and/or reproducing apparatus, the tab 115a pushes a detecting pin provided on the apparatus, and the apparatus may be put into a reproducing mode or a recording mode. Therefore, it is possible to record on the magnetic tape 12 of the miniature type tape cassette 10 by use of the standard type recording and/or reproducing apparatus.

On the other hand, when the tape cassette 10 with the removed tab 59 is accommodated within the tape cassette adapter 60, the detecting projection 115b enters within a depression which is formed due to the removed tab 59. Accordingly, the lever 115 does not rotate and remains in the original state, and the tab 115a is positioned at the innermost part of the depression 62b. Therefore, the depression 62b is open on the rear surface of the tape cassette adapter 60, and the tape cassette adapter 60 becomes of a shape identical to that of the standard type tape cassette of which the tab is removed. When the tape cassette adapter 60 in this state is loaded into the standard type recording and/or reproducing apparatus, the detecting pin provided on the apparatus enters within the depression 62b at the rear surface of the tape cassette adapter 60. Hence, the apparatus cannot be put into a recording mode, and can only be put into a reproducing mode. Thus, it is possible to prevent an accident in which the recorded contents on the magnetic tape 12 within the tape cassette 10 is erroneously erased.

Figure 19:
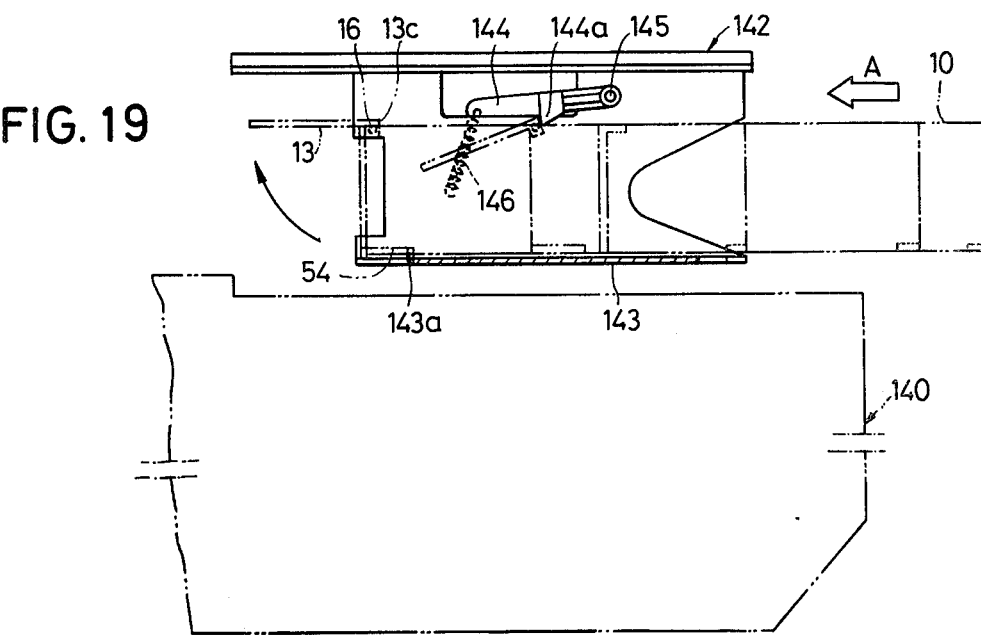
FIGS. 19 and 20 are diagrams respectively showing a side view and a plan view of a tape cassette housing in the apparatus shown in FIG. 18.
Figure 20:
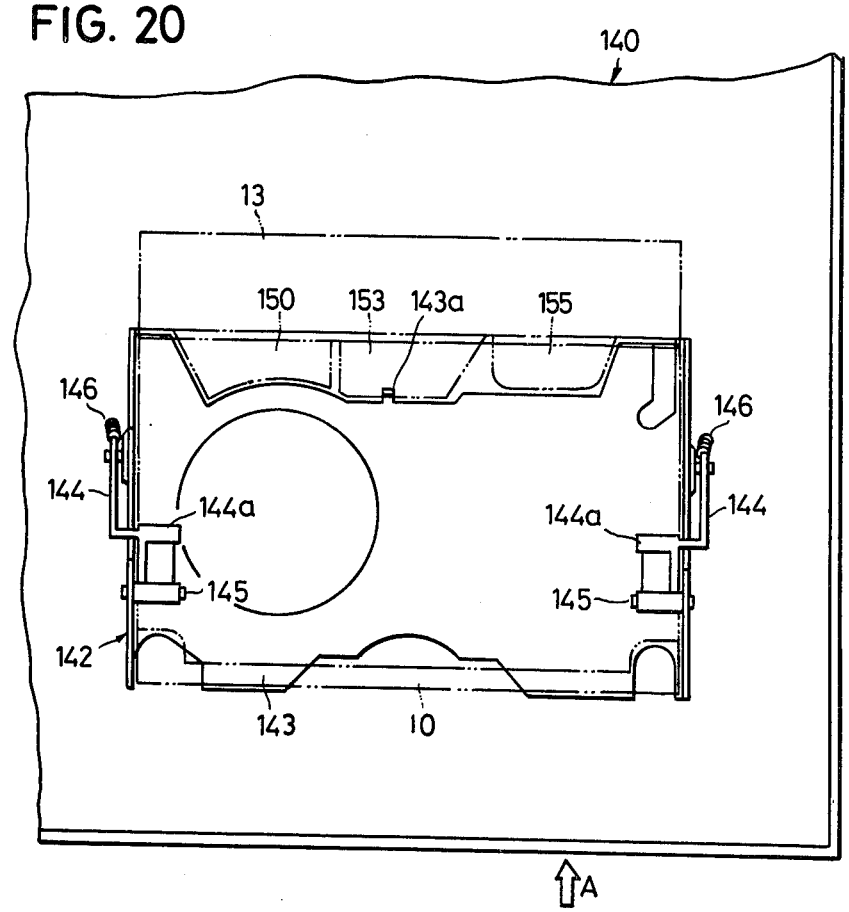

Next, description will be given with respect to a case where the tape cassette 10 is loaded into a compact type recording and/or reproducing apparatus, by referring to FIGS. 18 through 20.

Figure 18:
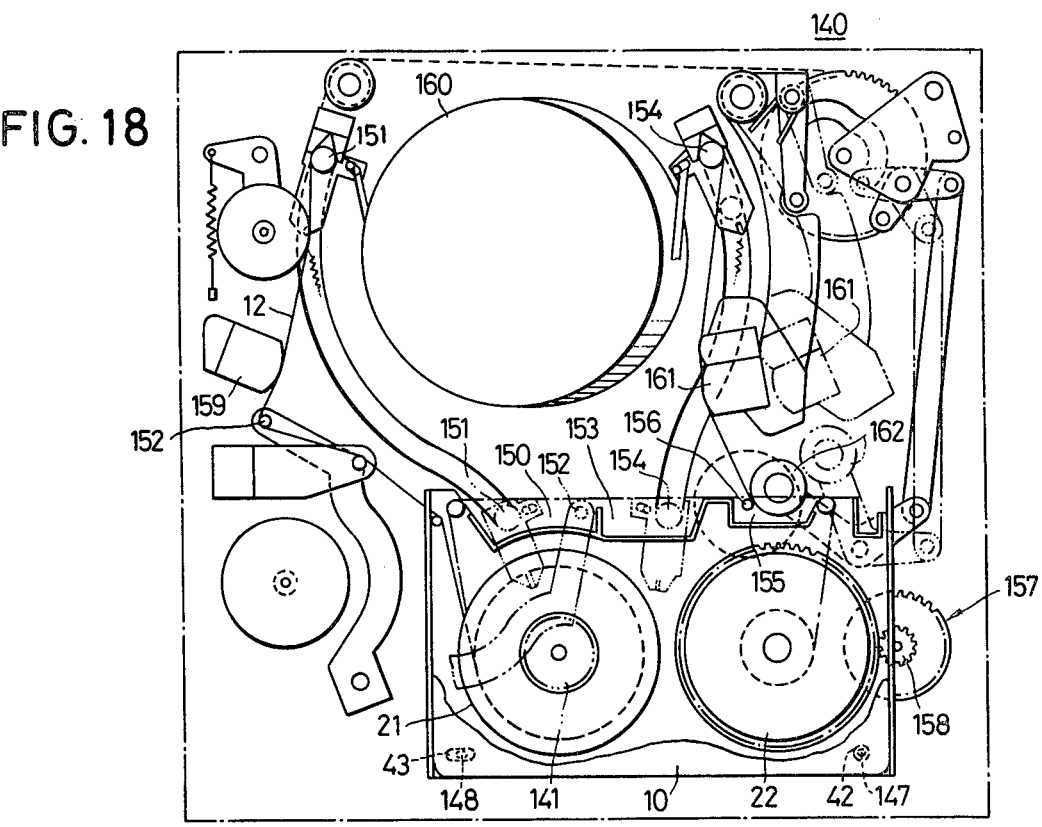
FIG. 18 is a plan view showing an example of a recording and/or reproducing apparatus designed exclusively for the tape cassette according to the present invention which is loaded with the tape cassette shown in FIG. 1, in a recording or reproducing mode.

FIG. 18 shows a compact type recording and/or reproducing apparatus 140. This compact type recording and/or reproducing apparatus 140 is of a smaller size, that is, the width and depth of the compact type recording and/or reproducing apparatus 140 are smaller than those of the standard type recording and/or reproducing apparatus 120.

A supply reel driving shaft 141 is provided at a cassette loading part of the above compact type recording and/or reproducing apparatus 140, however, a take-up reel driving shaft is not provided. As shown in FIGS. 19 and 20, the tape cassette 10 is inserted within a cassette housing 142 having a pop-up mechanism, by inserting the tape cassette 10 from the side of the lid 13 towards the direction of an arrow A, into a predetermined position where the end of the depressed step part 54 engages with a projection 143a of a bottom plate 143. The tape cassette 10 is thus loaded into the cassette loading part by being lowered together with the cassette housing 142. In a case where tape cassette 10 is erroneously inserted within the cassette housing 142 from the rear surface side of the tape cassette 10, the insertion of the tape cassette is prevented at a halfway position where the end of the depressed step part 55 hits the projection 143a. Hence, at this point, it can be realized that the tape cassette 10 was inserted facing the wrong direction.

The right and left side parts at the upper surface of the tape cassette 10 are pushed by pushing parts 144a of a pair of pushing levers 144 within the cassette housing 142, and the tape cassette 10 is accordingly pushed against the bottom plate 143. The pushing levers 144 are axially supported by a shaft 145, respectively, and urged to rotate in the counterclockwise direction by the force exerted by a coil spring 146.

When the cassette housing 142 is pushed downwards, the tape cassette 10 is accordingly lowered, and the tape cassette 10 is loaded within the loading part in a state where the central part of the supply reel 21 is inserted with the supply reel driving shaft 141. Moreover, the depressed step parts 57 and 58 provided at the bottom of the tape cassette 10 respectively engage with projecting step parts (not shown) provided at the loading part. Further, the tape cassette 10 is positioned by fitting the hole 42 and the longitudinal hole 43 over positioning pins 147 and 148 provided within the apparatus.

During the loading of the above tape cassette 10, a loading pole 151 and a tension pole 152 relatively enter within a cutout 150, while a loading pole 154 and a capstan 156 respectively and relatively enter into cutouts 153 and 155. Furthermore, the lid 13 makes contact with a lid opening projection (not shown) provided in the apparatus, and is relatively opened. In addition, a gear 158 which constitutes a rotation transmitting mechanism 157 on the recording and/or reproducing apparatus, meshes with the teeth on the outer periphery of the lower flange of the take-up reel 22.

In the above loaded state, the supply reel 21 is raised as shown in FIG. 3. Hence, the supply reel 21 becomes freely rotatable when rotationally driven at the center part thereof. Moreover, the braking member 45 is raised by the pin 147 as shown in FIG. 8, and the take-up reel 22 also becomes freely rotatable.

When the operational mode of the recording and/or reproducing apparatus 140 is set to a play mode, the above poles 151, 152, and 154 intercept and engage with the magnetic tape 12 to draw out the magnetic tape 12, and respectively move to positions indicated by solid lines in FIG. 18. Hence, the magnetic tape 12 is drawn out of the tape cassette 10, to make contact with a full-width erasing head 159. The magnetic tape 12 further makes contact with a guide drum 160, which is provided with rotary video heads, throughout a predetermined angular range, and also makes contact with an audio and control head 161. Thus the magnetic tape 12 is loaded onto a predetermined tape travelling path. During recording and reproduction, the magnetic tape 12 is driven in a state pinched between the capstan 156 and a pinch roller 162. Moreover, the gear 158 which is rotated by a reel driving motor (not shown) meshes with the gear teeth 27a of the take-up reel 22, and the take-up reel 22 is accordingly driven towards a tape take-up direction.

The full-width erasing head 159, the audio control head 161, and the guide drum 160 are constructed under a substantially the same standard as the corresponding heads 126 and 128 and the guide drum 127 of the standard type recording and/or reproducing apparatus 120. Accordingly, a signal is recorded onto and reproduced from the magnetic tape 12 with a tape pattern and format identical to those of the standard type recording and/or reproducing apparatus.

When an eject button (not shown) is pushed, the cassette housing 142 rises, and the tape cassette 10 is pushed out from the cassette housing 142 due to the action of a spring (not shown). In a case where the tape cassette 10 is pushed out towards the right in FIG. 19, the side edge 13c of the side surface flange part 13a of the lid 13 which is in an open state hits the pushing part 144a of the pushing lever 144. Hence, the lid 13 is applied with a force acting towards a lid closing direction, and the lid 13 closes against the force exerted by the U-shaped leaf spring 17. Thus, the tape cassette 10 is retrieved from the cassette housing 142 in a state where the lid 13 is closed.

Figure 21:
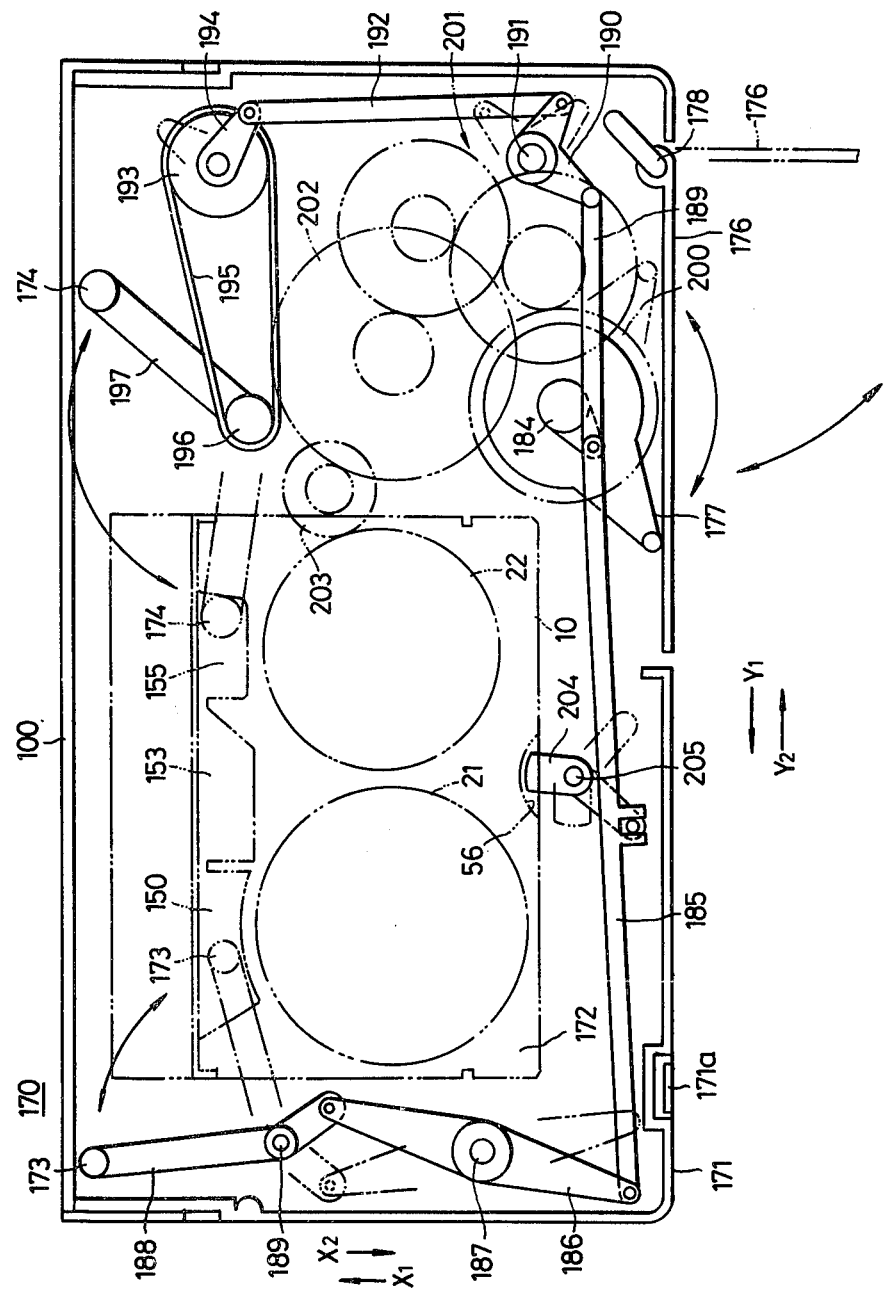
FIG. 21 is a plan view showing a mechanism in a lower half in another example of a tape cassette adapter which is loaded with the tape cassette shown in FIG. 1, in a state where an upper half is removed.

Next, description will be given with respect to another example of a tape cassette adapter, by referring to FIGS. 21 through 23. In FIGS. 21 through 23, those parts which are identical to those corresponding parts in FIGS. 9 and 10 are designated by the same reference numerals, and their description will be omitted.

A tape cassette adapter 170 is directed to improve the manipulating characteristic of the tape cassette adapter. That is, the tape cassette adapter 170 is capable of automatically performing the operations to draw out the magnetic tape 12 from the tape cassette 10 and accommodate the magnetic tape 12 within the tape cassette 10, within the tape cassette adapter 170.

The tape cassette 10 is accommodated within an accommodating part 172 of a lower half 171 of the tape cassette adapter 170, in a state where the magnetic tape 12 is not drawn out from the tape cassette 10. By accommodating the tape cassette 10 within the accommodating part 172, guide rollers 173 and 174 are relatively inserted into the cutouts 150 and 155 of the tape cassette 10, respectively. After the tape cassette 10 is accommodated within the above accommodating part 172, the lower half 171 of the tape cassette adapter 170 is covered by an upper half 175.

In the above state, a lid 176 at the rear of the tape cassette adapter 170 is opened, and a manipulation lever 177 within the tape cassette adapter 170 is manipulated to close the lid 176. By performing these series of manipulation, the magnetic tape 12 is drawn out from the tape cassette 10, to form a predetermined tape path within the tape cassette adapter 170, as described hereinbelow.

That is, when the lid 176 is opened by rotating the lid 176 about a shaft 178 by an angle of about ninety degrees, a lever 179 slides towards the direction of an arrow Y1. Moreover, an L-shaped lever 180 rotates towards the clockwise direction about a pin 181, and a lever 182 moves towards the direction of an arrow X1. The tip end of the lever 182 is linked to an arm 183 which is fixed to the shaft 101 of the opening and closing lid 100. By the above described movement of the lever 182, the lid 100 opens as shown in FIG. 23.

In the above state, the lever 177 is rotated towards the clockwise direction about a shaft 184 to a position indicated by a solid line in FIG. 21, from a position indicated by a two-dot chain line in FIG. 21. By this rotation of the lever 177, a connector 185 moves towards the direction of the arrow Y1, and a rotary lever 186 rotates about a shaft 187 towards the clockwise direction. When the above rotary lever 186 rotates, a first loading arm 188 rotates towards the counterclockwise direction about a shaft 189 to a position indicated by the solid line in FIG. 21. In addition, the connector 185 moves towards the direction of the arrow Y1, due to the rotation of the lever 177 in the clockwise direction. Thus, an L-shaped rotary lever 190 rotates in the clockwise direction about a shaft 191, a connector 192 moves towards the direction of an arrow X2, and a gear 193 rotates unitarily with a lever 194 towards the clockwise direction. By the above rotation of the gear 193, a gear 196 is rotated in the clockwise direction through a timing belt 195, and a second loading arm 197 rotates unitarily with the gear 196 towards the clockwise direction.

When the first and second loading arms 188 and 197 rotate as described above, the guide rollers 173 and 174 engage with the magnetic tape 12 to draw the magnetic tape 12 out from the tape cassette 10. At a final stage, the guide rollers 173 and 174 respectively reach positions corresponding to the positions of the guide rollers 93 and 94 of the tape cassette adapter 60 shown in FIG. 10. Accordingly, the magnetic tape 12 is drawn out from the take-up reel 22, and forms a tape path within the tape cassette adapter 170 which is similar to the tape path 12B indicated by the two-dot chain line in FIG. 10. Therefore, the magnetic tape 12 within the tape cassette 10 forms the above tape path without manually handling the magnetic tape 12, and is effective in view of protecting the magnetic tape.

After the above described operations are performed, the lid 176 is closed as shown in FIG. 21 by rotating the lid 176 in the clockwise direction. As the lid 176 is closed, the lever 182 moves towards the direction of the arrow X2 to close the lid 100. When the tape cassette adapter 170 is in operation, the manipulation lever 177 is subject to a torque in the counterclockwise direction due to tape tension applied to the guide roller 173. However, the lever 177 is held at the fully clockwise rotated position by the rear surface of the closed lid 176.

Furthermore, access to the lever 177 can only be made when the lid 176 is open. Hence, the lever 177 is always manipulated in a state where the lid 176 is open. Moreover, when the lid 176 is opened, the lid 100 of the tape cassette adapter 170 is opened, and the guide roller 174 can reach the operational position without hitting against the lid 100.

In addition, when the connector 185 moves towards the direction of the arrow Y1 due to the rotary manipulation of the above lever 177, a holding lever 204 rotates in the clockwise direction about a shaft 205. Hence, the holding lever 204 projects within the accommodating part 172, to hold the depressed step part 56 provided on the rear top of the tape cassette 10 and hold the tape cassette 10 within the accommodating part 172. Accordingly, the tape cassette 10 is prevented from being erroneously extracted from the accommodating part 172 in a state where the magnetic tape 12 is drawn out of the tape cassette 10. Moreover, in the case of the other tape cassette 10a, the holding lever 205 enters within the depression 56a, and the tape cassette 10a is similarly prevented from being extracted from the accommodating part 172 in the above state where the magnetic tape 12 is drawn out of the tape cassette 10a.

Furthermore, regardless of whether the tape cassette 10 (10a) is accommodated within the accommodating part 172, when an attempt is made to accommodate the tape cassette 10 (10a) within the accommodating part 172 of the tape cassette adapter 170 in a state where the guide rollers 173 and 174 are erroneously positioned at the positions indicated by the solid lines in FIG. 21 for completing the operation to draw out the magnetic tape 12, the tape cassette 10 (10a) hits the holding lever 205. Therefore, the tape cassette 10 (10a) is arrested by the holding lever 205 and is prevented from entering into the accommodating part 172, and the tape cassette 10

(10a) is thus prevented from being erroneously inserted into the tape cassette adapter 170.

If an attempt is made to extract the tape cassette 10 (10a) from the accommodating part 172 in a state where the magnetic tape 12 is drawn out of the tape cassette 10 (10a), or to accommodate the tape cassette 10 (10a) to the accommodating part 172 in a state where the guide rollers 173 and 174 are at the positions for completing the operation to draw out the magnetic tape 12, the magnetic tape 12 may become severely damaged. However, in the present embodiment of the invention, the tape cassette 10 (10a) can only be extracted from or accommodated within the accommodating part 172 when the holding lever 205 is in a state receded from the tape cassette. That is, the above extracting and accommodating operation with respect to the tape cassette 10 (10a) can only be performed when the guide rollers 173 and 174 are at the original positions, to prevent an accidental damage of the magnetic tape 12. Moreover, especially since the tape cassette 10 (10a) is provided with the depressed step part 56 (depression 56a), the holding lever 205 can hold the tape cassette 10 (10a) without projecting from the upper surface of the tape cassette 10 (10a). That is, the holding operation to prevent the tape cassette 10 (10a) from moving and being extracted, is performed within the range of the height of the tape cassette itself. Therefore, the above described construction is effective for the present embodiment of the invention wherein the tape cassette 10 (10a) having a height substantially equal to that of the tape cassette adapter is to be accommodated within the tape cassette adapter which is restricted of the height.

The tape cassette adapter 170 accommodating the tape cassette 10 is loaded into the standard type recording and/or reproducing apparatus 120 as shown in FIG. 17, as in the case of the above described tape cassette adapter 60. Hence, the recording and/or reproducing operation is accordingly performed in a similar manner as described above.

When the tape cassette 10 is extracted from the tape cassette adapter 170, the lid 176 is opened, and the lever 177 is rotated in the counterclockwise direction to the original position indicated by a two-dot chain line in FIG. 21. By rotating the lever 177 in this manner, the loading arms 188 and 197 respectively rotate in the clockwise and counterclockwise directions to the original positions, and the guide rollers 173 and 174 return and enter within the cutouts 150 and 155.

By manipulating the lever 177 in the above described manner, the rotation of a gear 200 which is unitarily provided with the lever 177 is transmitted to a gear structure 202 through a gear mechanism 201. Furthermore, the rotation of the gear 200 is further transmitted to the take-up reel 22 within the tape cassette 10 through a gear 203. Accordingly, the take-up reel 22 rotates in the clockwise direction to take-up the magnetic tape 12 drawn outside the tape cassette 10. Thus, the magnetic tape 12 drawn out of the tape cassette 10 is positively wound with no slack and accommodated within the tape cassette 10, due to the manipulation of the above manipulation lever 177. Therefore, it is not necessary to perform an operation especially for winding the magnetic tape after the lever 177 is manipulated, and the tape cassette 10 can be extracted from the accommodating part 172 immediately.

The gear structure 202 and the gear 203 roughly correspond to the gear structure 66 and the intermediate gear 80 shown in FIG. 10, respectively. Moreover, a uni-directional clutch is assembled within the gear mechanism 201, and the above rotational manipulation of the lever 177 in the clockwise direction is not transmitted to the gear structure 202. Hence, the rotation of the gear structure 202 in the clockwise direction due to the take-up reel driving shaft of the recording and/or reproducing apparatus, is not transmitted to the gear 200.

As shown in FIG. 21, the above described tape cassette adapter 170 has an erroneous erasure preventing tab 171a which can be snapped off, at a position corresponding to the position of the erroneous erasure preventing tab of the standard type tape cassette. When the tape cassette adapter 170 with the removed tab 171a is loaded into the standard type recording and/or reproducing apparatus, the apparatus cannot be put into a recording mode. Accordingly, the recorded contents on the magnetic tape within the tape cassette 10 accommodated within the tape cassette adapter 170, is prevented from being erroneously erased.

Figure 24:
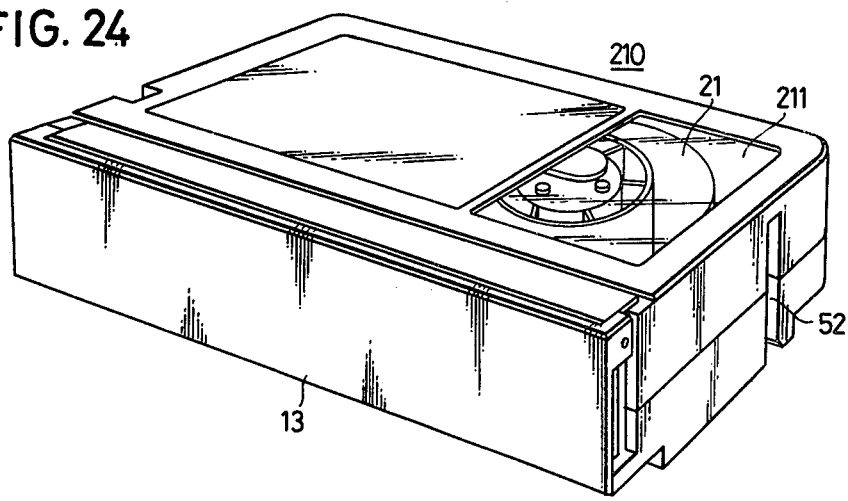
FIG. 24 is a perspective view showing another embodiment of a miniature type tape cassette according to the present invention.

FIG. 24 shows another embodiment of a tape cassette according to the present invention. In FIG. 24, those parts which are substantially same as those corresponding parts in FIGS. 1 and 2A through 2D are designated by the same reference numerals, and their description will be omitted. In a tape cassette 210, a depression (not shown) into which the holding lever 204 enters is provided on the rear of the tape cassette 210. Further, a transparent panel 211 is provided at the top of the tape cassette 210, at a part corresponding to the right half of the supply reel.

In either case where the above tape cassette 10 is independently loaded into the compact type recording and/or reproducing apparatus 140 or the tape cassette 10 is loaded into the standard type recording and/or reproducing apparatus 120 in a state accommodated within the tape cassette adapter 60, the supply reel 21 fits over the supply reel driving shaft 141 or 121 provided in the recording and/or reproducing apparatus, and the supply reel 21 is directly driven. Hence, the rotational accuracy of the supply reel 21 becomes high, and a highly accurate tape feeding operation can be obtained. Moreover, since the diameter d1 of the reel hub 25 in the supply reel 21 is large, the difference between the maximum and minimum diameters of the roll of the wound-tape on the above supply reel 21 is relatively small. Accordingly, the varying range of the rotational speed of the supply reel 21 from the start to the completion of recording and reproduction is small, and the tape running accuracy is improved.

On the other hand, with respect to the take-up reel 22, the take-up reel 22 is not fitted over the take-up reel driving shaft in either case where the above tape cassette 10 is independently loaded into the compact type recording and/or reproducing apparatus 140 or the standard type recording and/or reproducing apparatus 120 in a state accommodated within the tape cassette adapter 60. Thus, to a given size of the cassette, an amount of tape to be accommodated can be increased, or the size of the cassette case 11 can be reduced to a given amount of tape. The above take-up reel 22 is indirectly driven from the side of the cassette case 11 through the gear structure 66 and the intermediate gear 80. However, since there is no strict requirements in the rotational accuracy of the take-up reel 22, no drawbacks are introduced. Further, as the take-up reel 22 rotates without play around the fixed shaft 36, no extra space is required around the reel, and this helps to reduce the size of the tape cassette.

When the tape cassette 10 is unloaded from the loading part of the compact type recording and/or reproducing apparatus 140, the supply reel 21 and the braking member 45 respectively move downwards. Thus the supply reel 21 and the take-up reel 22 are both automatically locked so as not to rotate. Moreover, when the tape cassette 10 is removed from the tape cassette adapter 60, after the tape cassette adapter 60 is unloaded from the loading part of the standard type recording and/or reproducing apparatus 120, the braking member 45 similarly moves downwards to lock the take-up reel 22.

In each of the above embodiments of the invention, instead of providing the gear part at the peripheral side surface of the lower flange 27 of the take-up reel 22 within the tape cassette 10, a rubber roller may be used in the rotation transmitting mechanism within the tape cassette adapter. In this case, the rotation is transmitted to the lower flange 27 of the take-up reel 22 within the tape cassette 10, by use of the friction introduced therebetween.

Further, the present invention is not limited to these embodiments, but various variations and modifications may be made without departing from the scope of the present invention.

What is claimed is:

1. A miniature type tape cassette which may be used with either a standard type recording and/or reproducing apparatus which operates with a standard type tape cassette or with a different type of recording and/or reproducing apparatus which uses miniature cassettes, said miniature type tape cassette comprising:

a cassette case having a size which is smaller than the size of said standard type tape cassette; and a tape accommodated within said cassette case, tape cassette adapter means in the external form and size of a standard type tape cassette, said miniature type tape casette being independently loadable into said different type of recording and/or reproducing apparatus, and being loaded into said standard type recording and/or reproducing apparatus when mounted in said tape cassette adapter having said external form and size which is substantially equal to the form and size of said standard type tape cassette, said miniature type tape cassette being accommodated within said tape cassette adapter from which said tape is drawn out to form a predetermined tape path, said tape cassette adapter having tape draw-out means which operatively moves between first and second positions for drawing the tape from the cassette case to form said predetermined tape path responsive to a movement from said first position to said second position, and holding means which operatively moves between locking and unlocking positions for holding the miniature type tape cassette when it is accommodated within said tape cassette adapter responsive to moving from said unlocking position to said locking position, said holding means assuming said locking position to prevent a removal of the miniature type tape cassette from the tape cassette adapter when said tape draw-out means assumes a position other than said first position responsive to an operation of said tape draw-out means, said cassette case having a cutout opening which receives said tape draw-out means in said first position, and a cutout part which receives said holding means when said holding means assumes said locking position.

2. A miniature type tape cassette as claimed in claim 1 in which said cutout part is a depressed step part provided at the top of said cassette case.

3. A miniature type tape cassette as claimed in claim 2 in which said depressed step part is formed in a manner extending to the rear of the cassette case, at the opposite side from the front of said cassette case.

4. A miniature type tape cassette as claimed in claim 3 in which said depressed step part is provided in the vicinity of a center part along a ridge formed by the upper and rear of said cassette case.

5. A miniature type tape cassette as claimed in claim 1 in which said cutout part is a depression provided in the rear of the cassette case, at the opposite side from the front of said cassette case.

6. A miniature type tape cassette as claimed in claim 5 in which said depression is provided at a position near the top of said cassette case, in the rear of said cassette case.

7. A miniature type tape cassette as claimed in claim 5 in which said depression is provided in the vicinity of a center part between both side ends in the rear of said cassette case.

8. A miniature type tape cassette as claimed in claim 1 in which said cutout part is of a semi-circular shape.

* * * * *